United States Patent [19]

Trego

[11] Patent Number: 4,587,930
[45] Date of Patent: May 13, 1986

[54] PET FEEDING DISH HAVING DISPOSABLE LINER AND STATIONARY MOUNTING MEANS

[76] Inventor: Jeannie L. Trego, 338 N.Dillwyn Dr., Windy Hills, Newark, Del. 19711

[21] Appl. No.: 656,789

[22] Filed: Oct. 1, 1984

[51] Int. Cl.$^4$ .............................................. A01K 5/00
[52] U.S. Cl. ...................................................... 119/61
[58] Field of Search ............................ 119/61, 51.5, 1; 220/23.4; 248/207

[56] References Cited

U.S. PATENT DOCUMENTS

| | | | |
|---|---|---|---|
| 1,462,793 | 7/1923 | Hemelstrand | 119/61 |
| 1,796,297 | 3/1931 | Mahlstedt | 119/61 |
| 2,173,159 | 9/1939 | Ewan | 248/207 X |
| 3,152,576 | 10/1964 | Faurot | 119/51.5 X |
| 3,338,452 | 8/1967 | Oakley et al. | 220/23.4 |
| 3,653,362 | 4/1972 | Davis | 119/1 X |
| 3,661,121 | 5/1972 | Zielin | 119/61 |
| 3,698,594 | 10/1972 | Boehlert | 119/61 X |
| 4,261,294 | 4/1981 | Bescherer | 119/61 X |

Primary Examiner—Hugh R. Chamblee
Attorney, Agent, or Firm—Mortenson & Uebler

[57] ABSTRACT

A pet feeding dish is provided having a base receptacle for holding a disposable liner, the receptacle having mounting means for affixing the dish to a wall such as a kitchen baseboard or the like. The means for mounting the dish to a wall comprise a male extension extending outwardly and downwardly from the side wall of the base receptacle and being removably insertable into a female bracket affixed to the wall. The female bracket may be temporarily affixed to the wall as by an adhesive or it may be permanently installed, as with screws. Multiple dish units can be provided which are joined together. The dish(es) so provided will eliminate much of the mess and spilling associated with the feeding of pets.

7 Claims, 6 Drawing Figures

U.S. Patent  May 13, 1986  4,587,930
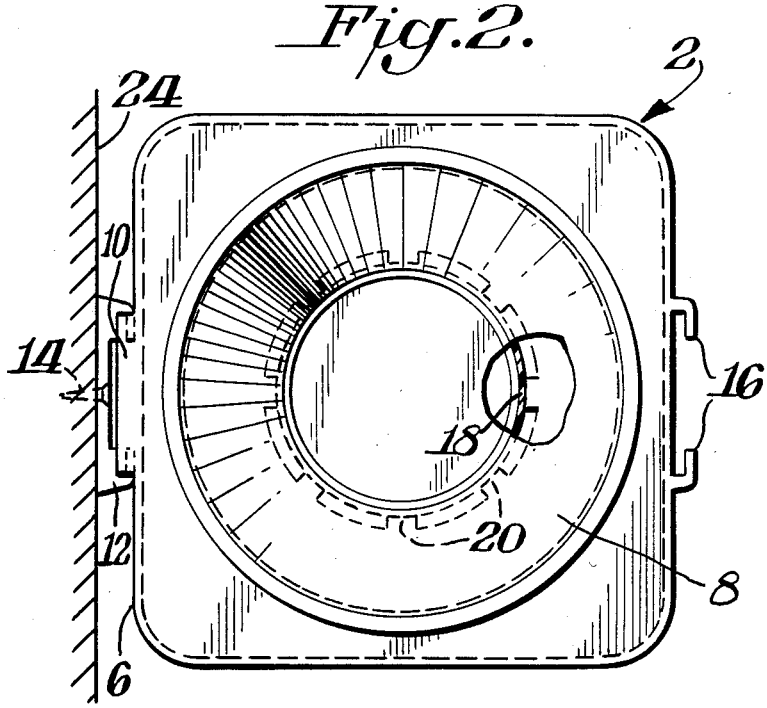
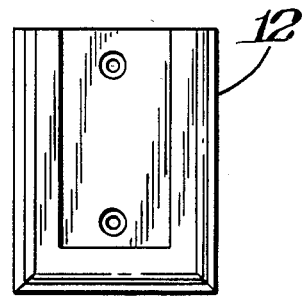
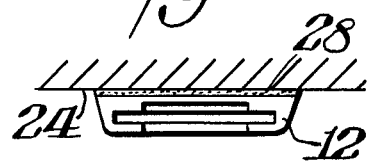
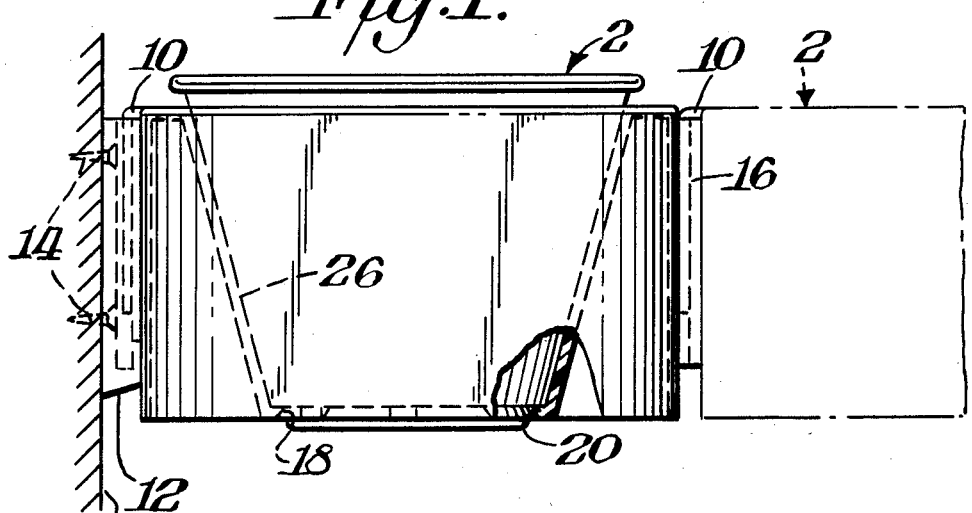
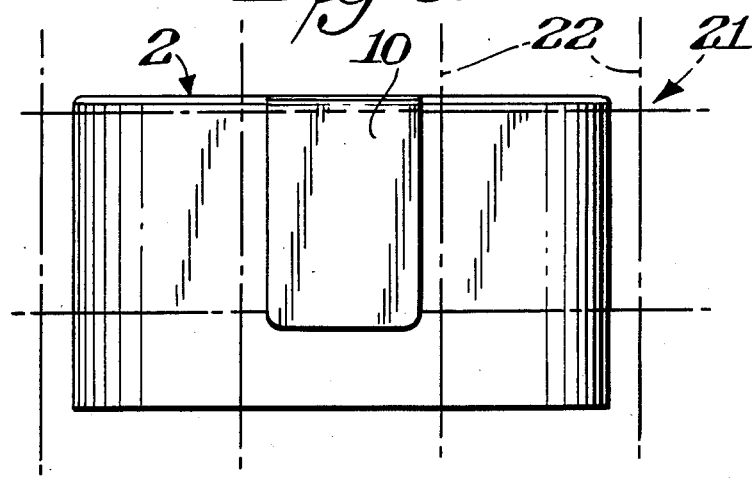
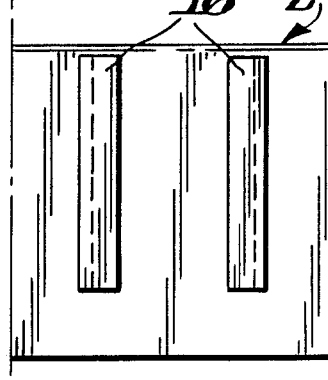

PET FEEDING DISH HAVING DISPOSABLE LINER AND STATIONARY MOUNTING MEANS

BACKGROUND OF THE INVENTION

This invention relates to a feeding dish for pets. The dish has a receptacle for holding a disposable liner and a male mounting extension for securely affixing the dish to a wall or the like by means of a complimentary female bracket affixed to the wall. Multiple dish units can be securely fastened together.

Pet feeders having disposable liners are known, exemplified by that disclosed in U.S. Pat. No. 3,698,594. Other liners and/or dishes are disclosed in U.S. Pat. Nos. 3,430,803; 2,728,209; 2,323,356 and 730,082.

Means for mounting pet feeders to a cage are disclosed in U.S. Pat. No. 3,554,165.

U.S. Pat. No. 3,776,193 discloses a feeder comprising a holder for food or water receptacles, in which the receptacles are of the disposable type. The holder is a pre-formed unit of plastic or similar construction having a conical recess for replaceably receiving a conical-shaped receptacle, and has a locating key, of a dowel form, extending therefrom for the engagement thereof by an apertured handle which projects from one side of the disposable receptacle. The receptacle holder is hollow and has a filler plug threadedly fixed in a wall thereof to facilitate a weighting of the holder by the introduction of water, sand, and the like, and to effect a sealing of the water or sand weighting vehicle. A plurality of holders can be fixed together, in juxtaposition, by means of bosses formed in a wall surface thereof, the bosses being configured to receive pin retainers which project from a decorative backboard.

The known prior art does not disclose or suggest the feeder of this invention.

SUMMARY OF THE INVENTION

A pet feeding dish is provided comprising a receptacle having a base and side wall extending upwards from said base for receiving and holding a disposable liner, the liner being removably placed into the receptacle, the receptacle having a male extension extending outwardly and downwardly from said side wall. Mounting means are provided on a wall or the like comprising a female bracket attached to the wall which is capable of removably receiving the male extension and securely affixing the receptacle to the wall when the extension is inserted into the bracket. The mounting means can be temporarily attached to the wall by means of an adhesive or the like, or permanently attached to the wall by means of screws or the like. The base preferably has a circular opening therethrough and a plurality of protrusions extending inwardly toward the center of the opening and disposed around the circumference of the opening, thereby providing means for removably retaining the disposable liner. The dish can be provided with a female bracket mounted on the side wall opposite the male extension, this bracket capable of removably receiving the male extension, thereby providing means for joining one dish to another, similar dish so that a plurality of the dishes can be attached together and affixed to a wall.

BRIEF DESCRIPTION OF THE DRAWINGS

FIG. 1 is a side elevational view, partly broken away, showing the dish of the invention attached to a wall structure, and showing a second, optional dish unit in phantom attached to the dish unit as shown.

FIG. 2 is a top plan view of the dish unit shown in FIG. 1.

FIG. 3 is a left side elevational view showing the device of this invention mounted on a wire fence or the like.

FIG. 4 is a fragmental right side elevational view of the dish receptacle of the invention.

FIG. 5 is a front elevational view of the female bracket assembly as shown in FIG. 1.

FIG. 6 is a top plan view of the bracket assembly mounted on a wall by means of an adhesive.

DETAILED DESCRIPTION OF THE INVENTION AND PREFERRED EMBODIMENTS WITH REFERENCE TO THE DRAWINGS

A pet feeding dish is provided having a base receptacle for holding a disposable liner, the receptacle having mounting means for affixing the dish to a wall such as a kitten baseboard or the like. The means for mounting the dish to a wall comprise a male extension extending outwardly and downwardly from the side wall of the base receptacle and being removably insertable into a female bracket affixed to the wall. The female bracket may be temporarily affixed to the wall as by an adhesive or it may be permanently installed, as with screws. Multiple dish units can be provided which are joined together. The dish(es) so provided will eliminate much of the mess and spilling associated with the feeding of pets.

The feeding dish of this invention could be mounted on a dog house, dog crate, camper, boat or affixed to a kitchen baseboard. This would prevent the receptacle from being accidently tipped over by a chain, animal or pet owner. The receptacle can be removed and cleaned when necessary and the disposable liner discarded when need be, providing a very sanitary means of feeding animals. In a veterinary hospital or laboratory, the disposable dish could be fitted with a top seal of plastic or paper and individual portions of food could be prepackaged. The device provides a very convenient item for a kennel, pet shop, zoo or household.

The invention is best described by reference to the drawings wherein FIG. 1 shows a side elevational view, in part broken away, showing the dish receptacle 2 of the invention attached to wall structure 24. The receptacle 2 has base 4 and side wall 6, and has a circular opening 18 in base 4 extending upwardly from the base 4 and having a taper 26 as shown through the receptacle assembly 2 and adapted to hold removable and disposable liner 8. Liner 8 is held removably in place by protrusions 20 located around circular opening 18. The receptacle 2 has male extension 10 extending outwardly and downwardly from the left side thereof as depicted in FIG. 1 and is inserted in female bracket 12 mounted on wall structure 24 by means of screws 14, thereby securely mounting the entire dish assembly and disposable liner in such a way that upsetting of the dish and spillage of the contents thereof by a pet is virtually impossible. Also shown in FIG. 1 on the right side of receptacle 2 are female bracket mounting means 16 adapted to accept a male extension 10 of the dish so as to enable attachment of a second, similar dish 2, as shown in phantom in FIG. 1. Thus any number of similar receptacles 2 can be securely mounted together and attached to wall 24. Typically two dishes would be used, one for food and one for water.

FIG. 2 is a top plan view of the dish assembly shown in FIG. 1, partly broken away, showing receptacle 2 mounted in bracket 12 by means of extension 10, the bracket 12 being secured to the wall structure 24 by screws 14. The generally circular opening 18 through the base of receptacle 2 is shown and, in the section broken away, protrusions 20 which aid in securing liner 8 into the receptacle are depicted. Female mounting brackets 16 are shown on the right side of receptacle 2 for engaging an extension 10 of a receptacle similar to that shown.

FIG. 3 shows receptacle 2 according to the invention mounted on a wire fence or the like 21 having generally vertical and horizontal wires 22, by means of extension 10 extending outwardly and downwardly from side wall 6 of receptacle 2 and engaging horizontal wires 22.

FIG. 4 shows a fragmental elevation of receptacle 2 having side wall 6 and female bracket members 16 adapted to accept an extension 10 of a similar dish and to hold it securely.

FIG. 5 shows a front elevational view of the bracket assembly 12 with screw means 14 affixing the bracket to the wall structure.

FIG. 6 shows a top plan view of the bracket assembly 12 affixed to wall structure 24 by means of adhesive 28.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A combination feeding dish and wall mounting means comprising a receptacle having a base and side wall extending upwards from said base for receiving and holding a disposable liner, said liner removably placed into said receptacle, said receptacle having a male extension extending outwardly and downwardly from said side wall, and mounting means for mounting on a wall or the like comprising a female bracket for attachment to said wall for removably receiving said male extension and affixing said receptacle to said wall when said female bracket is attached to said wall and said extension is inserted into said bracket.

2. The dish of claim 1 wherein said mounting means are temporarily attached to said wall by means of an adhesive or the like.

3. The dish of claim 1 wherein said mounting means are permanently attached to said wall by means of screws or the like.

4. The dish of claim 1 wherein said base has a circular opening therethrough and a plurality of protrusions extending inwardly toward the center of said opening and disposed around the circumference of said opening, thereby providing means for removably retaining said disposable liner.

5. The dish of claim 1 having a female bracket mounted on said side wall opposite said male extension, said bracket capable of removably receiving a male extension of another similar dish, thereby providing means for joining said dish to said similar dish.

6. A plurality of the dishes of claim 5 affixed together.

7. The combination of claim 6 affixed to said wall.

* * * * *